US010539187B2

United States Patent
Moeller

(10) Patent No.: US 10,539,187 B2
(45) Date of Patent: Jan. 21, 2020

(54) MONITORING THE FILLING LEVEL OF LUBRICANT IN A BEARING

(71) Applicant: Siemens Gamesa Renewable Energy A/S, Brande (DK)

(72) Inventor: Troels Kildemoes Moeller, Herning (DK)

(73) Assignee: Siemens Gamesa Renewable Energy A/S (DK)

( * ) Notice: Subject to any disclaimer, the term of this patent is extended or adjusted under 35 U.S.C. 154(b) by 0 days.

(21) Appl. No.: 15/765,348

(22) PCT Filed: Dec. 7, 2016

(86) PCT No.: PCT/EP2016/080018
§ 371 (c)(1),
(2) Date: Apr. 2, 2018

(87) PCT Pub. No.: WO2017/097809
PCT Pub. Date: Jun. 15, 2017

(65) Prior Publication Data
US 2018/0266488 A1    Sep. 20, 2018

(30) Foreign Application Priority Data

Dec. 8, 2015    (EP) .................................... 15198477

(51) Int. Cl.
*F16C 33/66* (2006.01)
*F16C 33/72* (2006.01)
*F03D 80/70* (2016.01)

(52) U.S. Cl.
CPC .......... *F16C 33/6625* (2013.01); *F03D 80/70* (2016.05); *F16C 33/6607* (2013.01);
(Continued)

(58) Field of Classification Search
CPC .... F03D 80/70; F05B 2260/64; Y02E 10/722; F16C 2360/31; F16C 19/52; F16C 33/6607; F16C 33/726; F16C 37/007
See application file for complete search history.

(56) References Cited

U.S. PATENT DOCUMENTS 3,494,673 A * 2/1970 Wilcox ................ B23Q 11/005
384/100
8,212,372 B2 * 7/2012 Fujioka .................. F16J 15/002
290/44
(Continued)

FOREIGN PATENT DOCUMENTS

| EP | 3085978 A1 | 10/2016 |
| GB | 426445 A | 4/1935 |
| WO | WO2015091719 A1 | 6/2015 |

OTHER PUBLICATIONS

PCT International Search Report corresponding to PCT International Application No. PCT/EP2016/080018.
(Continued)

*Primary Examiner* — Alan B Waits
(74) *Attorney, Agent, or Firm* — Schmeiser, Olsen & Watts LLP

(57) ABSTRACT

A method of monitoring the amount of lubricant inside a bearing of a wind turbine is provided. The bearing includes a lubricant for reducing wear and fatigue of the bearing, a seal for minimizing the amount of lubricant which is leaking out of the bearing, a ventilation device with at least one pressure compensation hole for enabling a pressure compensation between the sealed bearing and the ambient, and a lubricant drain hole for enabling lubricant to exit the bearing in a controlled manner. The method includes the steps of blowing a compressed medium through the pressure compensation hole into the bearing; measuring the pressure (Continued)

inside the bearing; and determining the amount of lubricant inside the bearing based on the measured pressure.

13 Claims, 4 Drawing Sheets

(52) U.S. Cl.
CPC ........ *F16C 33/726* (2013.01); *F16C 2300/14* (2013.01); *F16C 2360/31* (2013.01)

(56) References Cited

U.S. PATENT DOCUMENTS

| | | | | |
|---|---|---|---|---|
| 8,366,390 | B2* | 2/2013 | Tiscareno | F16C 19/08 384/473 |
| 2003/0048963 | A1 | 3/2003 | Jacquemont | |
| 2006/0054404 | A1* | 3/2006 | El-Ibiary | F16C 33/1085 184/6 |
| 2010/0254639 | A1 | 10/2010 | Yamazaki | |
| 2011/0222804 | A1* | 9/2011 | Okano | F16C 19/38 384/471 |
| 2011/0278851 | A1* | 11/2011 | Fujioka | F16J 15/002 290/55 |
| 2012/0315137 | A1* | 12/2012 | Alvarez | F01D 25/18 415/229 |
| 2015/0114337 | A1* | 4/2015 | Marthaler | F01M 11/061 123/196 CP |
| 2016/0312832 | A1* | 10/2016 | Moeller | F16C 33/6607 |
| 2017/0082145 | A1* | 3/2017 | Harada | F16C 33/7813 |
| 2017/0102003 | A1* | 4/2017 | Sishtla | F04D 17/122 |

OTHER PUBLICATIONS

PCT Written Opinion corresponding to PCT International Application No. PCT/EP2016/080018.
PCT International Preliminary Report on Patentability corresponding to PCT International Application No. PCT/EP2016/080018.
Extended European Search Report, Application No. 15198477.0.
Non-english Chinese Office Action dated Mar. 18, 2019 for Application No. 201680072088.5.

* cited by examiner

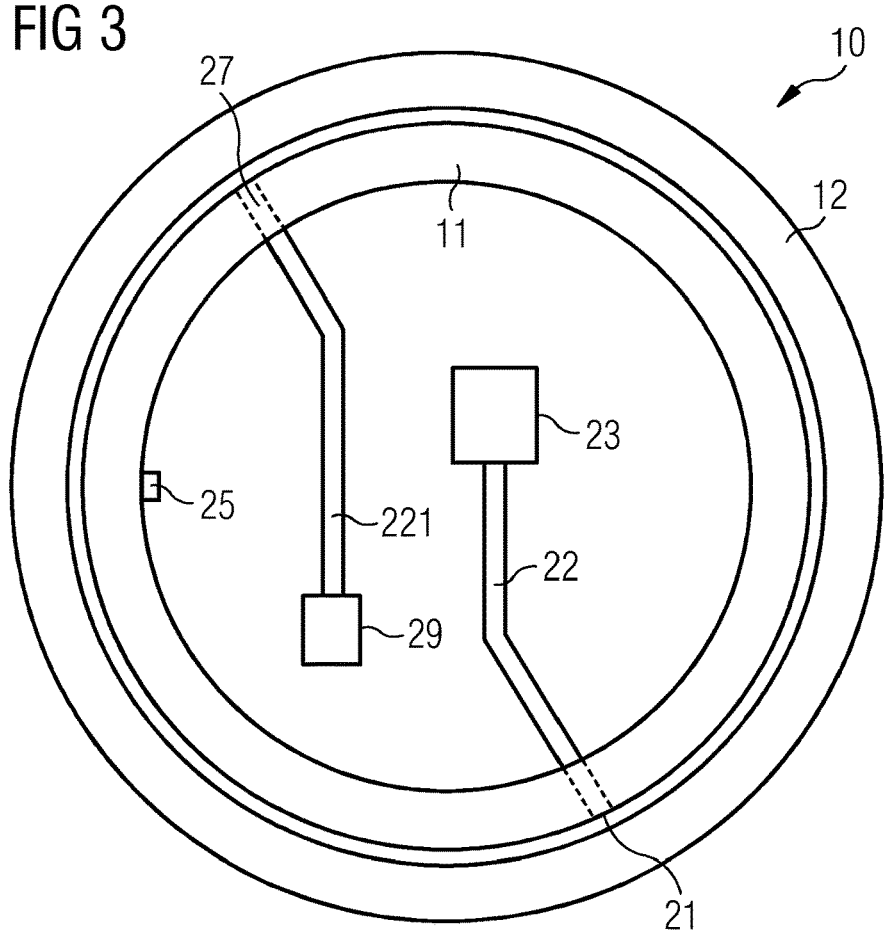
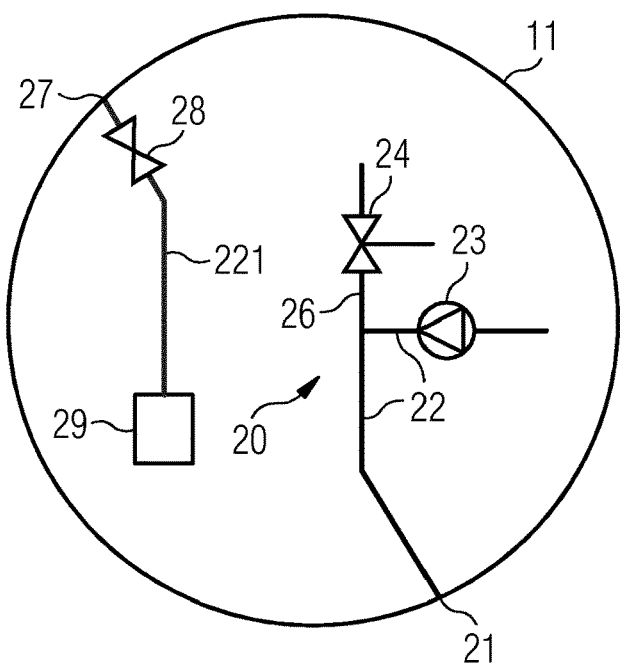

MONITORING THE FILLING LEVEL OF LUBRICANT IN A BEARING

CROSS-REFERENCE TO RELATED APPLICATIONS

This application claims priority to PCT Application No. PCT/EP2016/080018, having a filing date of Dec. 7, 2016, based on European Application No. 15198477.0, having a filing date of Dec. 8, 2015, the entire contents both of which are hereby incorporated by reference.

FIELD OF TECHNOLOGY

The following relates to a method of monitoring the amount of lubricant inside a bearing of a wind turbine. Furthermore, the following relates to a bearing of a wind turbine and to a wind turbine comprising such a bearing.

BACKGROUND

Many types of bearings comprise a lubricant such as grease or oil for reducing wear and fatigue of the bearing. In particular, wear and fatigue of the rolling elements and/or the raceways of the bearing are reduced by the provision of a lubricant inside the bearing.

Some lubricated bearings require frequent, periodic maintenance to prevent premature failure. Other lubricated bearings require little maintenance, these bearings being described by terms such as "sealed bearing" or "sealed for life". A sealed bearing comprises a seal such as a rubber lip which avoids or minimizes as best as possible leakage of the lubricant from inside the bearing to the ambient.

In practice, however, a certain leakage of lubricant out of the bearing has often to be accepted. This has the consequence that the amount of lubricant inside the bearing decreases over the time. This in return makes a refill of lubricant necessary from time to time.

A highly relevant question regarding timing and planning the moment to refill lubricant into the bearing is the question how large the amount of lubricant that exists inside the bearing actually is. Unfortunately, it is quite difficult to determine the amount of lubricant inside a bearing. In other words, it is difficult to determine the filling level of lubricant inside a bearing.

In the related art, determination of the filling level of lubricant has to be carried out manually by a service personnel examining the bearing. For large industrial type bearings, this is often done endoscopically. This, however, means that specialized service personnel is possibly needed. Furthermore, frequent visits for inspection of the bearing in order to determine the filling level of lubricant inside the bearing is costly.

Another approach in the related art is to ignore the actual filling level of lubricant inside a bearing, and instead to carry out a refill of lubricant in predefined intervals. This has the disadvantage that suboptimally timed service visits for refilling the bearing is made. Particularly for bearings of a wind turbine, with the wind turbine being located at a site which is difficult to access, unnecessary service visits for refilling lubricant into a bearing are costly. Sites which are difficult to access are, for example, offshore sites or sites at remote and/or mountainous regions.

Finally note that a delayed refill of lubricant to a bearing may cause considerable costs due to wear. Thus, a bearing which is operated at critically low filling levels of lubricant may cause considerable repair costs.

SUMMARY

An aspect relates to monitoring the amount of lubricant inside a bearing of a wind turbine in a simple and reliable manner.

According to embodiments of the invention, there is provided a method of monitoring the amount of lubricant inside a bearing of a wind turbine, wherein the bearing comprises a lubricant for reducing wear and fatigue of the bearing, a seal for minimizing the amount of lubricant which is leaking out of the bearing, and a ventilation device with at least one pressure compensation hole for enabling a pressure compensation between the sealed bearing and the ambient. Furthermore, the bearing comprises a lubricant drain hole for enabling lubricant to exit the bearing in a controlled manner. The method comprises the steps of blowing a compressed medium through the pressure compensation hole into the bearing; measuring the pressure inside the bearing; and determining the amount of lubricant inside the bearing based on the measured pressure.

The use of a lubricant and the use of a seal are standard solutions for bearings in general, cf. WO 2015/091719 A1, for instance. It is also well known to use such types of bearings for a wind turbine.

Also the provision of a lubricant drain hole in a bearing is a common option for bearings of a wind turbine. Such a lubricant drain hole has the objective to provide means for the lubricant to exit the bearing in a controlled manner. In other words, used lubricant, such as e.g. used grease, can be channeled out of the bearing and guided into, for instance, a lubricant container. Therein the used lubricant is collected and can be disposed during routine service visits of the wind turbine.

The further features of the bearing, namely the ventilation device comprising at least one pressure compensation hole is certainly not a standard solution in the state of the art for bearings of a wind turbine. The ventilation device has the objective to enable and ensure that the pressure inside the bearing and outside the bearing is substantially equal. This is advantageous because an overpressure inside the bearing has the effect that the seal is pushed in a direction such that the leakage rate of lubricant out of the bearing is increased. In other words, without a means of reducing overpressure inside the bearing, the risk of unfavorably high leakage rates is increased.

A key aspect of embodiments of the present invention is that, by the use of the pressure compensation hole, a compressed medium such as air is blown into the bearing, thus deliberately generating overpressure inside the bearing. Measuring this overpressure gives an indication about the actual filling level of lubricant inside the bearing. This indication, i.e. this insight, is gained by the fact that the pressure increase which is generated by blowing a certain, predetermined amount of compressed medium into the bearing depends significantly on the available volume of air inside the bearing.

To give a concrete example, in a first scenario one fifth of the volume inside the bearing is filled with air while four fifth of the volume is filled with lubricant. In this first scenario, a relatively high pressure increase is achieved by blowing in a predetermined amount of compressed medium. On the other hand, in a second scenario, assuming one fifth of the volume inside the bearing filled by lubricant and four fifth of the volume filled by air, a relatively small pressure increase is achieved by blowing in the same amount of compressed medium inside the bearing. By measuring the pressure inside the bearing during or after blowing in the compressed medium, the amount of lubricant inside the bearing can be determined. Thus, the amount of lubricant inside the bearing is indirectly measured.

A key advantage of the inventive method is that no visual inspection of the inside of the bearing is necessary in order to determine the amount of lubricant being present inside the bearing. Additionally, it can be imagined to automate the disclosed method steps such that the method can even be carried out remotely. This has the advantage that the filling level of the lubricant inside the bearing can even be determined and monitored remotely. Consequently, the present inventive method discloses a concept wherein determination of the amount of lubricant inside the bearing is highly simplified and improved compared to conventional methods.

In an embodiment of the invention, the pressure inside the bearing is measured in absolute values. For example, the pressure inside the bearing is determined to be 1.08 bar during or after carrying out the inventive method. Then, this measured absolute value can be compared to an initial, i.e. a default value, namely the pressure inside the bearing before the compressed medium has been blown in. In the given example, such an initial value may be one bar. Then the pressure increase inside the bearing is calculated by subtracting the initial pressure of the bearing from the measured pressure. In the given example this leads to the result of a pressure increase of 0.08 bar being caused by blowing in the compressed medium into the bearing.

In the following, two alternatives are explained, how the amount of lubricant inside the bearing may concretely be determined.

In a first alternative, the amount of lubricant inside the bearing is determined by correlating the maximum pressure increase with the amount of lubricant inside the bearing by means of a reference curve.

Specifically, the pressure increase is obtained by measuring the absolute value of the pressure inside the bearing and subtracting the initial pressure of the bearing from this measured absolute value. This pressure increase is determined continuously during blowing in the compressed medium into the bearing. Then, the maximum pressure increase is identified and this value of the maximum pressure increase is used to determine the amount of lubricant inside the bearing. This is advantageously been done by means of a reference curve. Such a reference curve, which may also be denoted as calibration curve, characterizes the dependency of the pressure increase on the amount of lubricant. This reference curve needs to be determined once for a special type of a bearing and can then be used continuously in order to translate a specific pressure increase value into an amount of lubricant being present inside the bearing. This is necessary because the inventive method is an indirect way of monitoring the amount of lubricant inside the bearing.

A second alternative to realize the determination of the amount of lubricant inside the bearing is by correlating the rate, i.e. the slope, of the time-dependent pressure increase with the amount of lubricant inside the bearing.

Specifically, a bearing with a low filling level of lubricant, i.e. with a high volume of air inside the bearing, features a smaller increase of the pressure inside the bearing compared to a bearing with a high filling level of lubricant, i.e. a small volume of air inside the bearing. Therefore, applying and blowing in a certain amount of compressed medium leads to a relatively strong and steep increase of the pressure inside the bearing in the case of a high filling level of lubricant, and leads to a relatively weak and flat increase in the case of a low filling level of lubricant.

The first alternative is specifically advantageous if it can be ensured that the volume inside the bearing is substantially sealed. In other words, there should be no or only negligible "contact" between the inside of the bearing and the ambient. Assuming that in general this sealing is realized by the seal of the bearing, it has to be only ensured only that the lubricant drain hole is actually entirely or widely blocked, i.e. covered, during determination of the filling level of the lubricant. In general this complete or almost complete blocking of the lubricant drain hole is realized if the lubricant drain hole is sufficiently small and the amount of lubricant which exits the lubricant drain hole is sufficiently high. In practice this assumption, or prerequisite, is often given at relatively high filling levels of the bearing, i.e. if relatively much lubricant is still present inside the bearing.

The second alternative is particularly interesting and advantageous when it cannot be ensured that the lubricant drain hole is completely or almost completely blocked during the whole time span when compressed medium is blown into the bearing. Assuming for example that the time span of blowing compressed medium into the bearing amounts to twenty seconds. If the lubricant drain hole is freed by pushing used lubricant out of the lubricant drain hole after, for example, ten seconds, then the measured pressure inside the bearing will probably decrease abruptly at that moment when the lubricant drain hole is freed. This is in principle undesired by the present method. At least it is undesired when the maximum pressure increase value is intended to be taken as a measure for the amount of lubricant being present inside the bearing. Still, the data during blowing of the compressed medium into the bearing from the beginning until the moment where the lubricant drain hole is freed can still be used namely by analyzing the rate, i.e. the slope, at which the pressure increases inside the bearing. In other words, the first derivative of the time-dependent pressure which is measured is analyzed and correlated to the amount of lubricant inside the bearing.

It is advantageous to use a compressor unit, which is connected with a pressure compensation hole for selectively blowing the compressed medium through the pressure compensation hole into the bearing. Experiences have shown that a time span between two seconds and sixty seconds, in particular a time span between ten seconds and thirty seconds, is advantageous for blowing in the compressed medium into the bearing.

The given values for a preferred time span are based on the finding that if the time span is chosen very small, it is difficult to monitor and observe a significant difference in the pressure increase between the case of a low filling level and the case of high filling level of lubricant inside the bearing. If, on the other side, the time span is chosen to be very large, for example larger than one minute, this has the drawback that deliberately a overpressure is created inside the bearing during a relatively long time span, which, as has been mentioned already, in principle is undesired as any overpressure inside the bearing causes an increased leakage rate of lubricant out of the bearing. Thus, a compromise has to be found between using overpressure for a limited time span in order to indirectly monitor the amount of lubricant inside the bearing, without however creating an undesired source of leakage of lubricant out of the bearing.

It is advantageous to set the pressure of the compressor unit, i.e. the pressure by which the compressed medium is blown into the bearing through the pressure compensation hole, at such a level that the impact of the counter pressure inside the bearing on the volume of compressed medium which is blown into the bearing during a specific time span is negligible. This can be achieved by choosing a sufficiently high pressure provided by the compressor unit. To give a concrete example, if the pressure inside the bearing is in the range between 1.0 bar and 1.3 bar, injecting the compressed medium into the bearing with a pressure of at least 2.0 bar ensures that substantially the same volume of compressed air is injected into the bearing, regardless whether the pressure inside the bearing is at the lower limit or the upper limit of the range of pressures given above.

In an advantageous embodiment, the bearing further comprises at least one drain hole valve for selectively shutting the lubricant drain hole. By having such a valve for deliberately shutting, i.e. closing the lubricant drain hole, the method can be amended advantageously by the further steps of shutting the lubricant drain hole by means of the drain hole valve during blowing the compressed medium through the pressure compensation hole—and opening the lubricant drain hole by means of the drain hole valve after having measured the pressure inside the bearing.

A key aspect of such a drain hole valve is that by activating, i.e. deliberately shutting the lubricant drain hole, the analysis is not dependent on the assumption that the lubricant drain hole remains blocked by used lubricant during the entire period of blowing compressed medium into the bearing. In other words, providing such a drain hole valve still makes it possible to apply the second alternative of determining the amount of lubricant inside the bearing by evaluating the rate or the slope of the pressure increase, but such a drain hole valve also enables a reliable use of the first alternative, namely evaluating the maximum pressure increase inside the bearing and correlating that value with the filling level of lubricant inside the bearing. Thus, it makes the monitoring more flexible and more reliable.

Furthermore, provision of such a drain hole valve is advantageous as it only signifies a minimum constructional detail to be added. Additionally, such valves are a standard device, which are inexpensive to procure and easy to add to the existing bearing.

Such a drain hole valve may be controlled pneumatically, hydraulically and/or electrically. In principle, it could even be controlled mechanically. Activation of the valve is advantageously carried out remotely.

Furthermore, the drain hole valve can be controlled actively or passively. An example of a passively controlled valve is a preloaded valve, e.g. preloaded by a mechanical spring, which closes the lubricant drain hole in a default state and opens it only at a predetermined pressure, e.g. an overpressure of 0.15 bar.

In a further embodiment, activation of the drain hole valve is carried out automatically and could be included into the general wind turbine controller, making operation of the wind turbine safer and service and maintenance work more efficient.

As a first option, in the case of a warning due to a low filling level of lubricant inside the bearing, e.g. the main bearing of the wind turbine, an automatic lubrication system can be programmed to speed up injection of fresh lubricant by pumping in a predetermined amount, e.g. twenty liter, of lubricant, e.g. grease, into the bearing.

As a second option, in the case of a warning due to a low filling level of lubricant inside the main bearing of the wind turbine, the drain hole valve could be programmed to shut and thus closing the lubricant drain hole completely. This would result in reduced further loss of lubricant out of the bearing—as the loss of lubricant is defined as the sum of leakage through seals and through drain holes—until refill of the bearing by fresh lubricant has been carried out.

The embodiment is furthermore related towards a bearing of a wind turbine, wherein the bearing comprises a lubricant for reducing wear and fatigue of the bearing, a seal for minimizing the amount of lubricant which is leaking out of the bearing and a ventilation device with at least one pressure compensation hole for enabling a pressure compensation between the sealed bearing and the ambient. Furthermore, the bearing is characterized in that the ventilation device comprises a compressor unit, which is connected with a pressure compensation hole such that a compressed medium can be selectively blown through the pressure compensation hole into the bearing.

As it has been described in detail during disclosure of the inventive method, such a bearing enables monitoring of the amount of lubricant inside the bearing in a simplified manner compared to conventional ways.

Note that such a bearing is different from conventional bearings by the presence of the compressor unit which is connected to the pressure compensation hole and which is able to selectively apply a pressure to push, i.e. to blow a compressed medium into the bearing.

Such a ventilation device can be used to indirectly determine and monitor the amount of lubricant inside the bearing. Note, however, that such a ventilation device can also be used to reliably ensure that the pressure compensation hole remains substantially unobstructed. This is due to the fact that by blowing the compressed medium through the pressure compensation hole, a consequence is that any dried lubricant which is present in the pressure compensation hole is blown into the bearing. As a consequence thereof the pressure compensation hole is freed of used lubricant after applying the pressure.

Note as well that in practice, however, it seems to be advantageous to separate the process of ensuring that the pressure compensation hole remains unobstructed and to deliberately blow in air into the bearing in order to indirectly monitor and determine the amount of lubricant inside the bearing.

In an advantageous embodiment, the bearing further comprises a lubricant drain hole for enabling lubricant to exit the bearing in a controlled manner.

This is advantageous in order to avoid that leakage of lubricant occurs at random positions, which might be needed to be identified first, and which then might be difficult to access.

In other words, this is advantageous in order to avoid overfilling and subsequent high risk of leakage.

It is also advantageous that the bearing comprises means which enable to selectively shut the lubricant drain hole. One non-limiting example of such means is a drain hole valve for having the option to selectively shut, i.e. to close the lubricant drain hole.

The embodiment can advantageously be applied to the main bearing of a wind turbine, as these bearings are particularly prone to increased leakage rates and refill issues. If the wind turbine comprises more than one main bearing, the present invention can be applied to some or all of these main bearings.

Note, however, that embodiments of the present invention are in principle applicable to any bearing of a wind turbine. It is even applicable to any bearing, i.e. also to bearings in other applications than wind turbines.

In one embodiment of the invention, the compressor unit is connected with the pressure compensation hole via a flexible hose and/or a stiff pipe.

Additionally, it is also preferred that the ventilation device further comprises another valve, in particular a two-way valve, which is arranged such that the valve can be closed during cleaning of the pressure compensation hole—such that a maximum pressure can be applied to the at least partially obstructed pressure compensation hole—and that the valve can be opened during an inactive state of the compressor unit such that a maximum pressure compensation between the sealed bearing and the ambient can be achieved.

The provision of such a valve has the effect that the compressed medium which is blown through the compressor compensation hole is used and exploited optimally.

It is furthermore advantageous, that the ventilation device comprises a pressure transducer for monitoring the pressure inside the bearing.

In practice, even a plurality of pressure transducers being distributed around the bearing may be used in order to even more reliably determine and monitor the pressure inside the bearing. A reliable but simple method to determine the actual absolute pressure inside the bearing is fundamental for carrying out the inventive method.

Finally, embodiments of the invention is also directed towards a wind turbine for generating electricity, wherein the main bearing of the wind turbine supporting the rotor of the wind turbine comprises a bearing such as described above.

BRIEF DESCRIPTION

Some of the embodiments will be described in detail, with references to the following Figures, wherein like designations denote like members, wherein:

FIG. 3 shows the same bearing as illustrated in FIG. 1, comprising in addition a lubricant drain hole being connected to a lubricant container;

FIG. 4 shows the same schematic overview as shown in FIG. 2, but for the bearing of FIG. 3;

Figure 1:
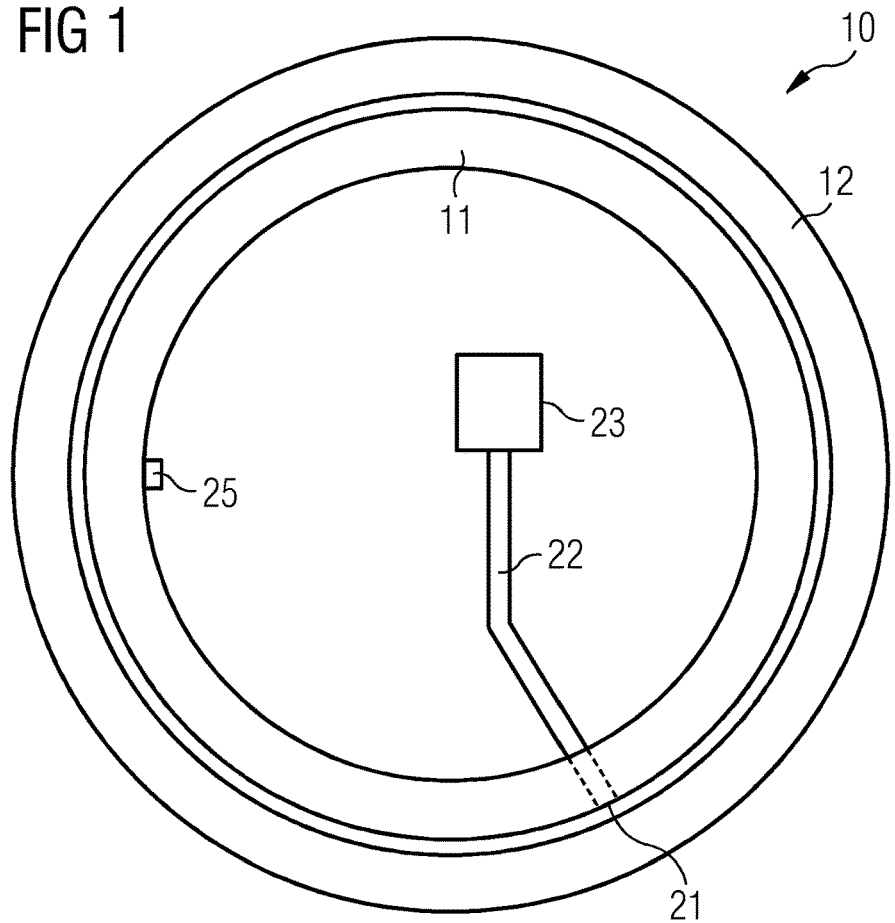
FIG. 1 shows a main bearing of a wind turbine with a compressor unit and a ventilation device.

The illustration in the drawings is schematically. Note that similar features and elements may be denoted by the same reference signs.

DETAILED DESCRIPTION

FIG. 1 shows a bearing 10 of a wind turbine, wherein the bearing 10 comprises an inner bearing ring 11 and an outer bearing ring 12. In the example as illustrated in FIG. 1, the inner bearing ring 11 is stationary and the outer bearing ring 12 is rotatable. This has to be understood that the inner bearing ring 11 is stationary relative to the nacelle and the tower of the wind turbine, while the outer bearing ring 12 is rotatable relative to the nacelle of the wind turbine. In the example of FIG. 1, the inner bearing ring 11 and the outer bearing ring 12 both have an annular shape and are arranged in a co-axial manner. The bearing may, for example, be a roller bearing such as a three-roller bearing or a double-tapered bearing.

The inner bearing ring 11 comprises a pressure compensation hole 21. The purpose of the pressure compensation hole 21 is to enable a pressure compensation between the pressure inside the bearing 10 and the ambient. The pressure compensation hole 21 is directly connected with a connection means 22, e.g. a flexible hose. At the opposite end of the connection means 22, i.e. opposite to the pressure compensation hole 21, a compressor unit 23 is arranged. The compressor unit 23 is a small air compressor for providing a pulse of compressed air during a pulse length of a few seconds. The compressor unit 23 is configured by a controller which activates and deactivates the compressor.

The ventilation device 20 furthermore comprises a pressure transducer 25. The pressure transducer 25 is arranged at the inner bearing ring 11 and is able to continuously monitor the pressure inside the bearing 10. The pressure transducer 25 may in particular be able to transmit the determined pressure values in a wireless manner to a controller unit where these pressure values are further processed.

Figure 2:
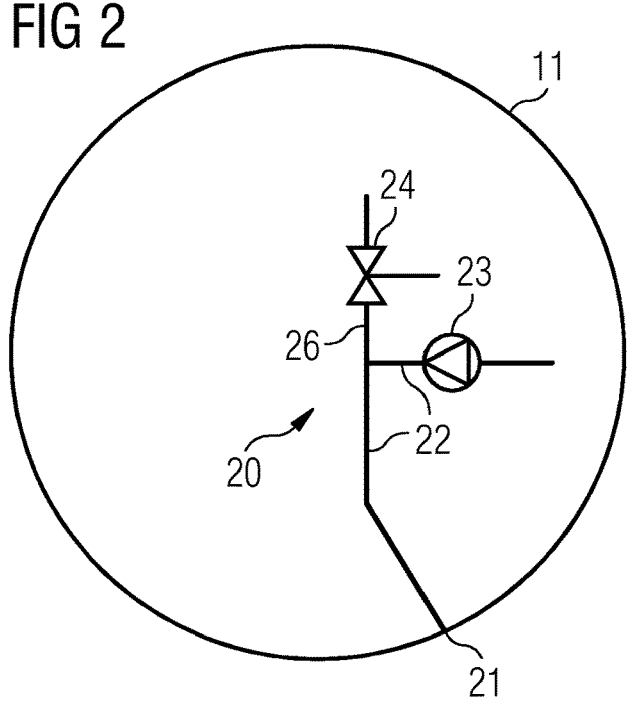
FIG. 2 shows a schematic overview of the configuration of the valve at the compressor unit.

FIG. 2 shows a schematic view of an embodiment of a ventilation device 20. In this embodiment, a depressurization means 26 is diverting from the connection means 22 for guiding the over-pressurized air from inside the bearing into the ambient in a controlled manner. A two-way valve 24 which can be activated electrically is located at the depressurization means 26. If the compressor unit 23 is activated, i.e. pressurized air is blown into the pressure compensation hole 21; the two-way valve 24 is closed. This ensures an efficient and powerful pressure pulse through the pressure compensation hole 21. After the cleaning sequence, i.e. after deactivation of the compressor unit 23, the two-way valve 24 is opened such that air from inside the bearing can flow through the connection means 22 and subsequently through the depressurization means 26 into the ambient. This ultimately leads to a reduction of lubricant leakage out of the bearing.

FIGS. 3 and 4 show a first embodiment of a bearing according to embodiments of the invention.

FIG. 3 shows the same bearing 10 of a wind turbine as in FIG. 1, comprising in addition a lubricant drain hole 27 which is connected to a lubricant container 29. The bearing 10 comprises an inner bearing ring 11 and an outer bearing ring 12. The inner bearing ring 11 and the outer bearing ring 12 are separated by a relatively small gap. In this gap, the rolling elements, such as balls or cylinders, may be arranged. In order to reduce wear and fatigue of the bearing, in particular of the rolling elements and the raceways of the bearing, lubricant is present in the gap, i.e. in the volume, between the inner bearing ring 11 and the outer bearing ring 12.

Furthermore, the inner bearing ring 11 comprises a pressure compensation hole 21. This pressure compensation hole 21 enables a pressure equalization between the volume inside the bearing and the ambient. The pressure compensation hole 21 is directly connected via connection means 22 with a compressor unit 23. The compressor unit 23 has the objective to deliberately and selectively inject a compressed medium through the pressure compensation hole 21 into the bearing 10. By this, the compressor unit 23 has, on the one hand, the possibility to blow used and dried lubricant being present in the pressure compensation hole 21 into the bearing, and, on the other hand, it provides means to deliberately create overpressure inside the bearing which can be used for monitoring the amount of lubricant inside the bearing.

Note that the bearing 10 of FIG. 3 also comprises a lubricant drain hole 27 which is connected via further connection means 221 with a lubricant container 29. The lubricant drain hole 27 has the objective to enable used lubricant to exit the bearing in a controlled manner. In practice, this means that used lubricant exits the bearing via the lubricant drain hole 27 and is guided via the further connection means 221 into the lubricant container 29. The lubricant container 29 as such can then be emptied and disposed manually by service personnel. As an example, the dimensions of the lubricant drain hole 27 may be sixteen millimeter in diameter and one hundred and thirty millimeter in length for a bearing with a diameter of the inner bearing ring 11 of three meter.

FIG. 4 shows the bearing of FIG. 3 in a schematic view. For sake of clarity and in order to avoid repetitions, the following description of FIG. 4 focuses on the additional features displayed in FIG. 4 compared to FIG. 2. As one additional feature, FIG. 4 illustrates the drain hole valve 28 which is positioned adjacent to the lubricant drain hole 27. The drain hole valve 28 can be used to selectively close the lubricant drain hole 27 by selectively shutting the drain hole valve 28. The drain hole valve 28 is advantageously activated electrically or pneumatically/hydraulically. Such an activation can advantageously be carried out remotely.

Figure 5:
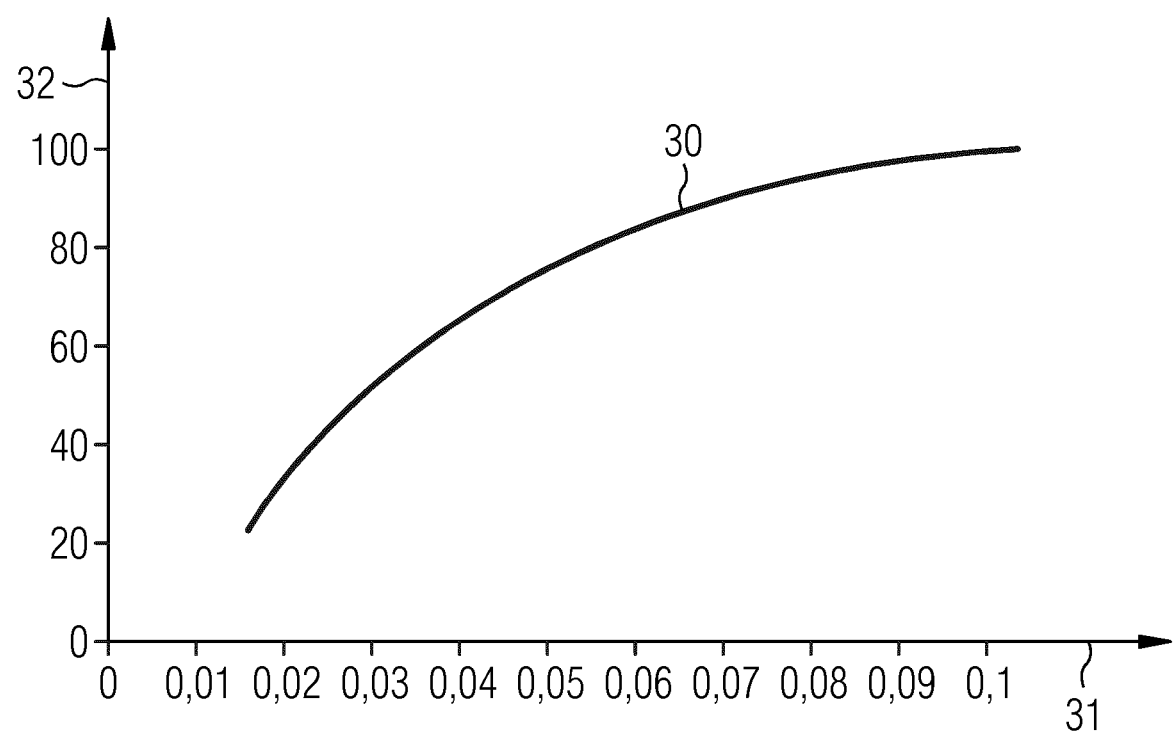
FIG. 5 shows a reference curve for the maximum pressure increase in relation with the amount of lubricant inside the bearing.

FIG. 5 shows a reference curve 30, correlating the amount 32 of lubricant with the maximum pressure increase 31, which has been named as the first alternative of determining the amount 32 of lubricant inside the bearing. Specifically, the reference curve 30 displays exemplarily the amount 32 of lubricant in units of liter compared to the pressure increase in units of bar, wherein the pressure increase refers to the maximum value which is achieved during one measurement. It shows that if, for example, a relatively small pressure increase of 0.02 bar is determined, this implies that the filling level of lubricant amounts to a relatively low value of 40 liter. If, on the other hand, a high pressure increase of for example 0.1 bar is measured, this implies a high filling level of lubricant in the bearing of approximately 100 liter. Such a reference curve is needed for each specific type of bearing and ensures an assignment of the determined maximum pressure increase into an amount of lubricant being present inside the bearing.

Figure 6:
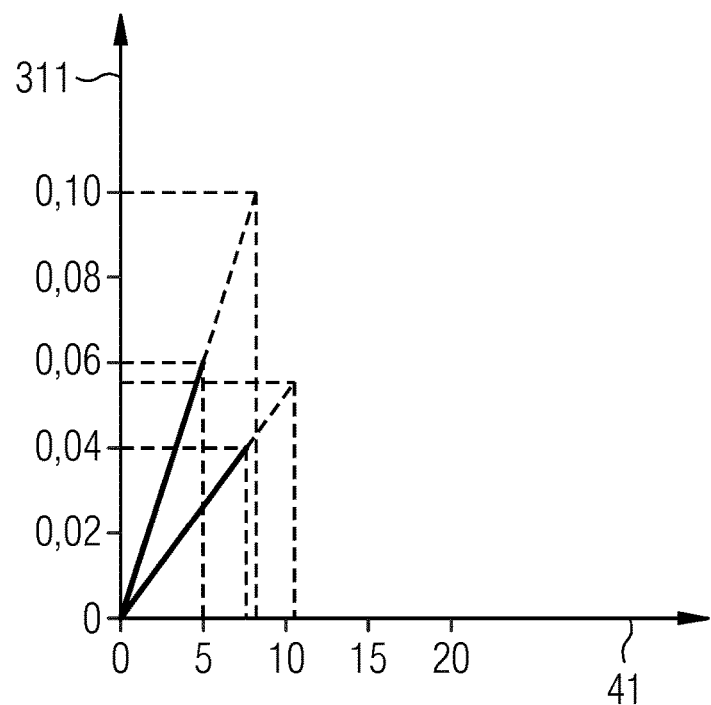
FIG. 6 shows the slopes of two time-dependent pressure increase curves.

FIG. 6 illustrates the second alternative for determining the amount of lubricant inside the bearing, namely via evaluation of the slope of the pressure increase over time. The pressure increase is again displayed in units of bar, while the time axis is displayed in units of seconds. It can be seen that a typical measurement lasts about a few seconds. The curves in solid lines display the actually measured pressure increase (note that in reality the absolute pressure is measured in the bearing and the pressure increase is calculated by subtracting the initial pressure from the measured pressure). The dashed lines in FIG. 6 symbolize the development and evolution of the measured curves of the pressure increase under the assumption that no disruption of the measurement by de-blocking the lubricant drain hole would have taken place. Although the theoretically possible maximum pressure value has not been obtained due to the disruptive de-blocking of the lubricant drain hole, valuable information can be drawn out of the measurements. In this exemplary case, the first curve with the measured pressure increase amounting up to 0.06 bar correlates to a relatively high filling level of lubricant, while the second curve with the measured pressure increase amounting up to 0.04 bar implies a filling level which is smaller compared to the first curve. By evaluating the slope of the curves quantitatively, even a quantitative statement regarding the filling level of lubricant can be made in principle.

Figure 7:
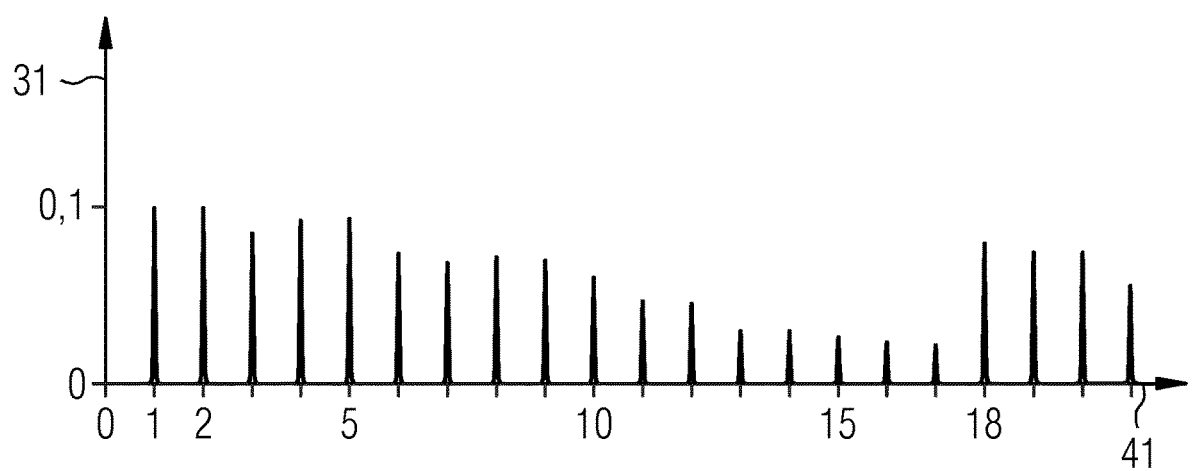
FIG. 7 shows an exemplary evolution of the measured maximum pressure increase over three weeks.

Finally, FIG. 7 illustrates an example of determined values of the maximum pressure increase during a time period of three weeks. Note that on the X axis the time in units of days is displayed. In this example, one measurement has been carried out per day. At the beginning of the measurement cycle, the obtained maximum pressure increase was relatively high amounting up to around 0.1 bar. This level was maintained up to the fifth day. Subsequently, the achievable maximum pressure increase decreased until seventeenth day. After the measurement on day 17, a refill of lubricant into the bearing has taken place which is clearly visible by the significantly increased maximum pressure value on day 18.

In the example as illustrated in FIG. 7, the advantages of embodiments of the present invention can clearly be seen: Without any physical presence by service personnel at the wind turbine, the decrease of the filling level of lubricant inside the bearing could be analyzed neatly, leading to a service visit for refilling lubricant inside the bearing on day 17. In other words, a highly simplified and reliable method for monitoring the amount of lubricant inside a bearing of a wind turbine is provided by embodiments of the present invention.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method of monitoring the amount of lubricant inside a bearing of a wind turbine,
    wherein the bearing comprises:
        a lubricant for reducing wear and fatigue of the bearing,
        a seal for minimizing the amount of lubricant which is leaking out of the bearing,
        a ventilation device with at least one pressure compensation hole for enabling a pressure compensation between the sealed bearing and the ambient, and
        a lubricant drain hole for enabling lubricant to exit the bearing in a controlled manner, and
    wherein the method comprises the steps of:
        blowing into the bearing a predetermined amount of a compressed medium through the pressure compensation hole,
        measuring the pressure inside the bearing, and
        determining the amount of lubricant inside the bearing based on the measured pressure.

2. The method according to claim 1, wherein the method comprises the further step of
    calculating a pressure increase inside the bearing, which is generated by blowing the compressed medium into the bearing, by subtracting an initial pressure of the bearing from the measured pressure.

3. The method according to claim 1, wherein the amount of lubricant inside the bearing is determined by correlating the maximum pressure increase with the amount of lubricant inside the bearing by a reference curve.

4. The method according to claim 1,
wherein the amount of lubricant inside the bearing is determined by correlating
the rate/slope of the time-dependent pressure increase with
the amount of lubricant inside the bearing.

5. The method according to claim 1
wherein the ventilation device further comprises a compressor unit, which is connected with the pressure compensation hole such that the compressed medium can be selectively blown through the pressure compensation hole, and
wherein the compressor unit blows the compressed medium through the pressure compensation hole during a time span between two seconds and sixty seconds or between ten seconds and thirty seconds.

6. The method according to claim 1,
wherein the bearing further comprises at least one drain hole valve for selectively shutting the lubricant drain hole, and
wherein the method further comprises the steps of
shutting the lubricant drain hole by means of the drain hole valve during blowing the compressed medium through the pressure compensation hole, and
opening the lubricant drain hole by means of the drain hole valve after having measured the pressure inside the bearing.

7. A bearing of a wind turbine, wherein the bearing comprises
a lubricant for reducing wear and fatigue of the bearing,
a seal for minimizing the amount of lubricant which is leaking out of the bearing, and
a ventilation device with at least one pressure compensation hole for enabling a pressure compensation between the sealed bearing and the ambient,
wherein the ventilation device further comprises a compressor unit, which is connected with the pressure compensation hole such that a predetermined amount of a compressed medium can be selectively blown through the pressure compensation hole into the bearing,
wherein the ventilation device further comprises a pressure transducer for measuring the pressure inside the bearing,
wherein the measured pressure is used to determine an amount of lubricant in the bearing.

8. The bearing according to claim 7, wherein the bearing further comprises a lubricant drain hole for enabling lubricant to exit the bearing in a controlled manner.

9. The bearing according to claim 8, wherein the bearing further comprises a drain hole valve, such that the lubricant drain hole can be shut selectively.

10. The bearing according to claim 7, wherein the bearing is a main bearing of a wind turbine suitable for supporting the rotor of the wind turbine.

11. The bearing according to claim 7, wherein the compressor unit is connected with the pressure compensation hole via a flexible hose and/or a stiff pipe.

12. The bearing according to claim 7, wherein the ventilation device further comprises a two-way valve which is arranged such that
the valve is closed during cleaning of the pressure compensation hole such that the pressure compensation hole is at least partially obstructed such that a maximum pressure can be applied to the at least partially obstructed pressure compensation hole, and
the valve is open during an inactive state of the compressor unit such that a maximum pressure compensation between the sealed bearing and the ambient can be achieved.

13. A wind turbine for generating electricity, wherein the main bearing supporting the rotor of the wind turbine comprises a bearing according to claim 7.

* * * * *